United States Patent
Guru

(10) Patent No.: US 7,317,723 B1
(45) Date of Patent: Jan. 8, 2008

(54) ACTION BASED TERMINATION OF MULTIDIMENSIONAL LOOKUP

(75) Inventor: Parthibhan Parama Guru, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 814 days.

(21) Appl. No.: 10/771,673

(22) Filed: Feb. 3, 2004

(51) Int. Cl.
*H04L 12/56* (2006.01)

(52) U.S. Cl. ............... 370/392; 370/469; 370/474

(58) Field of Classification Search ............ None
See application file for complete search history.

(56) References Cited

U.S. PATENT DOCUMENTS

| | | | |
|---|---|---|---|
| 5,027,350 A | | 6/1991 | Marshall |
| 5,473,607 A | | 12/1995 | Hausman et al. |
| 5,509,006 A | | 4/1996 | Wilford et al. |
| 5,852,607 A | | 12/1998 | Chin |
| 5,872,783 A | | 2/1999 | Chin |
| 5,881,242 A | | 3/1999 | Ku et al. |
| 5,917,820 A | | 6/1999 | Rekhter |
| 5,951,651 A | * | 9/1999 | Lakshman et al. .......... 703/239 |
| 6,091,725 A | | 7/2000 | Cheriton et al. |
| 6,167,445 A | | 12/2000 | Gai et al. |
| 6,219,706 B1 | | 4/2001 | Fan et al. |
| 6,243,667 B1 | | 6/2001 | Kerr et al. |
| 6,282,546 B1 | | 8/2001 | Gleichauf et al. |
| 6,308,219 B1 | | 10/2001 | Hughes |
| 6,324,656 B1 | | 11/2001 | Gleichauf et al. |
| 6,377,577 B1 | | 4/2002 | Bechtolsheim et al. |
| 6,453,360 B1 | * | 9/2002 | Muller et al. .............. 709/250 |
| 6,529,508 B1 | * | 3/2003 | Li et al. .................... 370/392 |
| 6,772,223 B1 | * | 8/2004 | Corl et al. ................. 709/238 |
| 6,778,530 B1 | * | 8/2004 | Greene ...................... 370/389 |
| 7,027,446 B2 | * | 4/2006 | Rosenfeld et al. ..... 370/395.31 |
| 7,154,888 B1 | * | 12/2006 | Li et al. .................... 370/389 |
| 7,193,997 B2 | * | 3/2007 | Van Lunteren et al. ..... 370/392 |
| 2002/0163909 A1 | * | 11/2002 | Sarkinen et al. ........... 370/386 |
| 2003/0156586 A1 | * | 8/2003 | Lee et al. .................. 370/392 |
| 2003/0185220 A1 | * | 10/2003 | Valenci ...................... 370/398 |

OTHER PUBLICATIONS

U.S. Appl. No. 09/557,480, filed Apr. 24, 2000, by Andrew McRae, entitled A Method for High Speed Packet Classification.

(Continued)

*Primary Examiner*—Wing Chan
*Assistant Examiner*—Brian Roberts
(74) *Attorney, Agent, or Firm*—Cesari and McKenna LLP

(57) ABSTRACT

A technique classifies packets in a manner that enables the number of lookup operations performed when classifying a data packet to be reduced. A lookup operation is performed to identify a set of rules and a set of actions associated with the data packet. If the action is the same for all the rules represented in the set of rules, the data packet is classified in accordance with the action and further lookup operations are not performed. Otherwise, a next-level lookup operation is performed and the process is repeated. This process continues for successive levels until either a level is reached where the packet is classified or a final level is reached. If a final level is reached, an action is performed based on the results of the lookup operation at the final level.

20 Claims, 13 Drawing Sheets

OTHER PUBLICATIONS

U.S. Appl. No. 10/170,896, filed Jun. 13, 2002, by Andrew McRae, entitled Incremental Compilation for Classification and Filtering Rules.

U.S. Appl. No. 10/072,824, filed Feb. 8, 2002, by Liani Li et al., entitled Method for Classifying Packets Using Multi-Class Structures.

Pankaj Gupta and Nick McKeown, Packet Classification on Multiple Fields, ACM SIGCOMM '99, Sep. 1999, Harvard University, pp. 1-14.

T.V. Lakshman and D. Stiliadis, High-Speed Policy-based Packet Forwarding Using Efficient Multi-dimensional Range Matching, 1998, pp. 203-214.

* cited by examiner

{ UPPER 16 BITS
OF IP SOURCE ADDRESS
FIRST-LEVEL LOOKUP TABLE
[0] = 1
⋮
1205 { 1206a -------- [49251] = 1
1206b -------- [49252] = 2
1206c -------- [49253] = 3
1206d -------- [49254] = 1
⋮
[65535] = 1

LOWER 16 BITS
OF IP SOURCE ADDRESS
FIRST-LEVEL LOOKUP TABLE
[0] = 1
⋮
1208a -------- [255] = 1
1208b -------- [256] = 2
1208c -------- [257] = 1
⋮
[65535] = 1 } 1207

UPPER 16 BITS
OF IP SOURCE ADDRESS
FIRST-LEVEL EQUIVALENCE SET
1215 {  INDEX  RULE   ACTION
1210a ---- 1  0 0 0 1 1  0 0 0 1 1
1210b ---- 2  1 1 0 1 1  1 0 0 1 1
1210c ---- 3  0 0 1 1 1  0 0 1 1 1

LOWER 16 BITS
OF IP SOURCE ADDRESS
FIRST-LEVEL EQUIVALENCE SET
 INDEX  RULE   ACTION
1220a ---- 1  0 0 0 1 1  0 0 0 1 1
1220b ---- 2  1 1 1 1 1  1 0 1 1 1 } 1225

RULE CROSS-PRODUCT              RULE        ACTION CROSS-PRODUCT       ACTION
1236a — [1,1] = 0 0 0 1 1 & 0 0 0 1 1   0 0 0 1 1   0 0 0 1 1 & 0 0 0 1 1   0 0 0 1 1
1236b — [1,2] = 0 0 0 1 1 & 1 1 1 1 1   0 0 0 1 1   0 0 0 1 1 & 1 0 1 1 1   0 0 0 1 1
1235 { 1236c — [2,1] = 1 1 0 1 1 & 0 0 0 1 1   0 0 0 1 1   1 0 0 1 1 & 0 0 0 1 1   0 0 0 1 1
1236d — [2,2] = 1 1 0 1 1 & 1 1 1 1 1   1 1 0 1 1   1 0 0 1 1 & 1 0 1 1 1   1 0 0 1 1
1236e — [3,1] = 0 0 1 1 1 & 0 0 0 1 1   0 0 0 1 1   0 0 1 1 1 & 0 0 0 1 1   0 0 0 1 1
1236f — [3,2] = 0 0 1 1 1 & 1 1 1 1 1   0 0 1 1 1   0 0 1 1 1 & 1 0 1 1 1   0 0 1 1 1

SECOND-LEVEL
LOOKUP TABLE
1270a --- [1,1] = 0
1270b --- [1,2] = 0
1270c --- [2,1] = 0
1270d --- [2,2] = 1    } 1275
1270e --- [3,1] = 0
1270f --- [3,2] = 2

SECOND-LEVEL EQUIVALENCE SET
 INDEX  RULE   ACTION
1280a ---- 0  0 0 0 1 1  0 0 0 1 1
1280b ---- 1  1 1 0 1 1  1 0 0 1 1   } 1285
1280c ---- 2  0 0 1 1 1  0 0 1 1 1

FIG. 12

ACTION BASED TERMINATION OF MULTIDIMENSIONAL LOOKUP

CROSS-REFERENCE TO RELATED APPLICATIONS

The present invention is related to co-pending and commonly assigned U.S. patent application Ser. No. 09/557,480, now issued as U.S. Pat. No. 6,970,462, titled, "A Method for High Speed Packet Classification," which was filed on Apr. 24, 2000, U.S. patent application Ser. No. 10/072,824, now issued as U.S. Pat. No. 7,154,888, titled "Method for Classifying Packets Using Multi-Class Structures" which was filed on Feb. 8, 2002, and U.S. patent application Ser. No. 10/170,896, now issued as U.S. Pat. No. 7,236,493 titled, "Incremental Compilation for Classification and Filtering Rules" which was filed on Jun. 13, 2002.

BACKGROUND OF THE INVENTION

1. Field of the Invention

The invention relates generally to processing data packets, and more specifically to the high speed filtering and/or classification of data packets.

2. Background Information

In a communications network, there is a well-recognized need to classify information units, such as data packets, that are passed between various intermediate nodes in the network, e.g., routers and switches, in order to support a wide range of applications, such as security control, packet filtering, Class of Service (CoS) and Quality of Service (QoS). Often, these intermediate nodes use access control lists (ACLs) to, inter alia, classify packets for these applications. An ACL typically comprises an ordered list of access control entries (ACEs), i.e., rules, where each rule defines a pattern (criterion) that is compared with data packets to be classified. The pattern may specify a source address, a destination address, a protocol or some other entity that is searched for in the data packet. For example, the pattern might be defined to search for a specific protocol in a data packet's header such as, the Transmission Control Protocol (TCP) or the Internet Protocol (IP). The pattern is used to determine if the rule applies to the data packet. If the pattern is found in the data packet, the rule is said to apply to the packet. As used herein, a packet header is that portion of a data packet that is used to classify the packet.

Associated with each rule is an action that specifies an act to be taken if the rule applies. In its simplest form, this action may be to "permit" the matched data packet to proceed towards its destination or to "deny" the packet from proceeding any further. In a more sophisticated form, complex policies and filtering rules may be implemented in the ACL to determine the course of the data packet. Conversely, if there is no match to any of the ACL's rules, the action may be to drop the data packet, i.e., "a final deny."

Typically, a data packet is classified by searching for the first rule in the ACL that applies to the packet and performing the action associated with the rule. The number of rules involved and the amount of processing time needed to make this determination often depends on the approach taken. For example, one approach would be to run through the list of rules starting from the first rule in the list to the last rule in the list until a matching rule, i.e., a rule that applies to the data packet, is found. This approach is simple, but is not very efficient. For example, the time spent processing each data packet may vary as packets that meet the criteria associated with rules earlier in the list will be processed faster than packets that meet criteria associated with rules that are positioned farther down the list.

One approach to obtaining an overall faster processing of packets is to predetermine how often each rule is matched and place the most matched rules at the top of the list. However, this method is highly dependent on the packet mix and is not very flexible.

Another approach implements a technique whereby packets are classified using a predetermined number of lookup operations, such as described in U.S. patent application Ser. No. 09/557,480, now issued as U.S. Pat. No. 6,970,462, titled, "A Method for High Speed Packet Classification" filed on Apr. 24, 2000, by Andrew McRae and hereinafter referred to as the "'480 application." This technique involves dividing a packet's header into sections and applying the sections to a fixed hierarchy of lookup tables to determine an outcome such as, e.g., a first matching rule that applies to the packet. The lookup tables are associated with equivalence sets that represent all possible combinations of matching rules for all values of the packet header sections. The sections of the packet are applied to a first level of lookup tables in the lookup table hierarchy to select entries in the first level tables that are associated with the packet. The contents of the selected entries are, in turn, applied to a second level of tables to select entries whose contents are applied to a third level and so on. Eventually, an entry in a final level table is selected and the matching rule associated with the packet is determined from the results of the selected entry final table entry.

The technique described in the '480 application assumes the lookup tables exist before a packet is classified. Computing resources, such as processor time and memory, needed to generate these lookup tables depends in part on the number of rules in the ACL. Generally, as the number of rules in the ACL increases, the computing resources needed to build and hold the lookup tables also increases. In systems having limited computing resources, the number of rules that can be supported by this technique may be limited.

A technique similar to the '480 application that utilizes system resources more efficiently is described in U.S. patent application Ser. No. 10/170,896, now issued as U.S. Pat. No. 7,236,493, titled, "Incremental Compilation for Classification and Filtering Rules" filed on Jun. 13, 2002 and hereinafter referred to as the "'896 application." Like the '480 application, the '896 application employs a packet classifying technique that that uses a fixed hierarchical arrangement of lookup tables containing a first level and a series of successive levels to classify packets in a fixed number of lookup operations. The first level lookup tables are pre-generated. The successive level lookup tables are generated on a demand basis, i.e., when needed to classify a packet. The technique conserves valuable intermediate node resources, such as memory and computing resources, as table entries are calculated when needed meaning unlike the technique described in the '480 application where table entries calculated whether they are actually used or not.

One problem with the above-described techniques is that they require lookup operations at all levels of tables in the lookup table hierarchy before the packet is classified. In some cases, lookup operations performed to access information contained in the tables at successive levels in the hierarchy may be unnecessary as an action associated with classifying a data packet may have been determined by information accessed from prior lookup operations. For example, if a lookup table hierarchy contains four lookup tables, four lookup operations must be performed before an action associated with classifying a packet is known and can be performed. If after the second lookup operation enough information is acquired to determine the action, the remaining two lookup operations are still performed, even though they do not affect the action taken to classify the packet. Execution of these latter, unnecessary lookup operations wastes valuable resources and the present invention is directed to a technique that reduces such unnecessary operations.

SUMMARY OF THE INVENTION

The present invention relates to a technique for classifying a data packet using a reduced number of lookup operations that are needed to determine an action to be taken by an intermediate node to classify the data packet. According to the technique, a portion of the packet used to classify the packet is divided into sections. A lookup operation is performed by the intermediate node on a first-level lookup table to identify a set of rules and a set of actions for each section. For a set of rules and a set of actions associated with a particular section, the following procedure is performed. If each action in the set of actions is the same for all the rules represented in the set of rules, the data packet is classified in accordance with the action and further lookup operations are not performed. Otherwise, a lookup operation is performed on a next-level lookup table and above procedure is repeated. The lookup operation and procedure continues for successive levels until either the packet is classified or a final level is reached. If a final level is reached, the result of the lookup operation at the final level is used to classify the packet.

Illustratively, a packet template is established that divides a packet header associated with the data packet into a plurality of sections. A first-level lookup table and an associated first-level equivalence set are generated for each section. Each entry in the lookup table for each section is associated with a rule bitmap, which represents a set of rules associated with the lookup table entry, and an action bitmap, which represents a set of actions (e.g., permit or deny) for each rule represented in the rule bitmap. Both the rule bitmap and action bitmap are contained in the equivalence set. The data packet is classified by dividing the packet's header into a plurality of sections as defined by the template and applying each section to the section's lookup table to (in accordance with a lookup operation) acquire the rule bitmap and action bitmap associated with the section. Specifically, the section is used to index into the first-level lookup table to acquire a first-level equivalence set index. The first-level equivalence set index is then used to index into the first-level equivalence set to acquire a rule bitmap and an action bitmap associated with the section.

The action bitmap is checked to determine if it indicates the same action (e.g., "all permit" or "all deny") for each rule represented in the rule bitmap. If so, the packet is classified (e.g., permitted or denied) based on the action and successive lookup operations are not performed. Otherwise, if the action bitmap does not indicate the same action, a next-level lookup table and equivalence set is generated and the lookup operation described above is repeated on the next-level lookup table and next-level equivalence set. The process continues until a level yields an action that is the same for all rules represented in the rule bitmap or a final level is reached. If the final level is reached, the results of the final level, i.e., an index value, is used to classify the packet.

By checking the action associated with each lookup operation to determine if the action is the same for all rules associated with the lookup operation, the inventive technique determines if successive level lookup operations are necessary to classify a packet. Advantageously, the inventive technique is an improvement over prior techniques in that it enables a packet to be classified with a reduced amount of lookup operations.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 12 is an example of merging of two first-level equivalence sets to generate a next-level equivalence set and lookup table in accordance with the inventive technique.

DETAILED DESCRIPTION OF AN ILLUSTRATIVE EMBODIMENT

Figure 1:
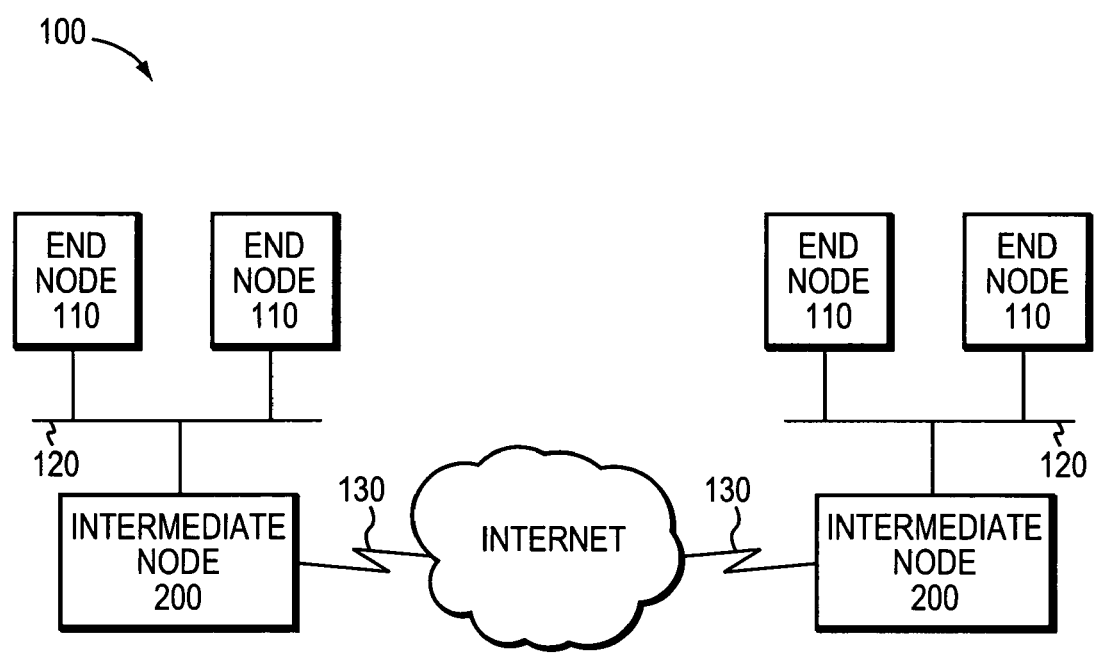
FIG. 1 is a schematic block diagram of a computer network that may be advantageously used with the present invention.

FIG. 1 is a schematic block diagram of a computer network 100 that may be advantageously used with the present invention. Computer network 100 comprises a collection of communication links and segments connected to a plurality of nodes, such as end nodes 110 and intermediate nodes 200. The network links and segments may comprise local area networks (LANs) links 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP).

Figure 2:
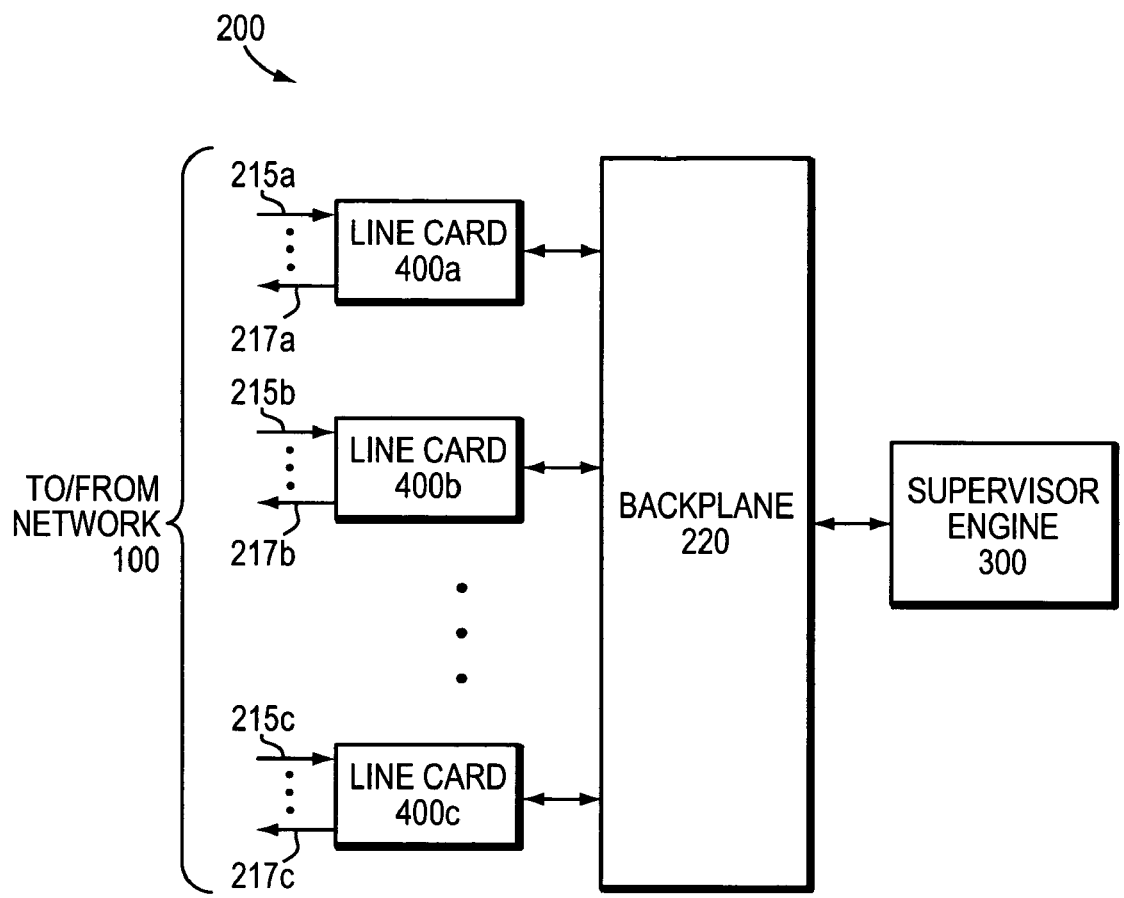
FIG. 2 is a high-level partial schematic block diagram of an intermediate node that may be advantageously used with the present invention.

FIG. 2 is a high-level partial schematic block diagram of intermediate node 200, which is illustratively a router, that may be advantageously used with the present invention. Suitable intermediate nodes that may be used with the present invention include the Cisco 7200 Series Routers and the Cisco 7600 Series Routers available from Cisco Systems Incorporated, San Jose, Calif. Intermediate node 200 comprises one or more line cards 400 and a supervisor engine card 300 interconnected by a backplane 220. Node 200 is configured to perform, inter alia, various conventional layer-2 (L2) and layer-3 (L3) switching and routing functions including forwarding and processing of data packets in accordance with the inventive technique. As used herein, L2 and L3 refer to the data link layer and network layer, respectively, of the Open Systems Interconnection (OSI) reference model. Node 200 is also configured to provide support for various combinations of protocols including, e.g., Open Shortest Path First (OSPF), Intermediate-System-to-Intermediate-System (IS-IS), Multiprotocol Label Switching (MPLS), TCP/IP, Ethernet, Asynchronous Transfer Mode (ATM), and multi-channel T3.

The backplane 220 comprises a point-to-point interconnect fabric that interconnects the various cards and allows data and signals to be transferred from one card to another. The line cards 400 connect (interface) the intermediate node 200 with the network 100. The line cards 400 transfer and acquire data packets to and from the network via output ports 217 and input ports 215, respectively, using various protocols such as, ATM, Ethernet, and T3. Functionally, the line cards 400 acquire data packets from the network 100 via the input ports 215 and forward the data packets to the backplane 220, as well as transfer data packets acquired from the backplane 220 to the network 100 via the output ports 217. The ports 215, 217 may comprise, e.g., ATM, Ethernet, Fast Ethernet (FE), Gigabit Ethernet (GE), and frame relay (FR) ports.

Figure 3:
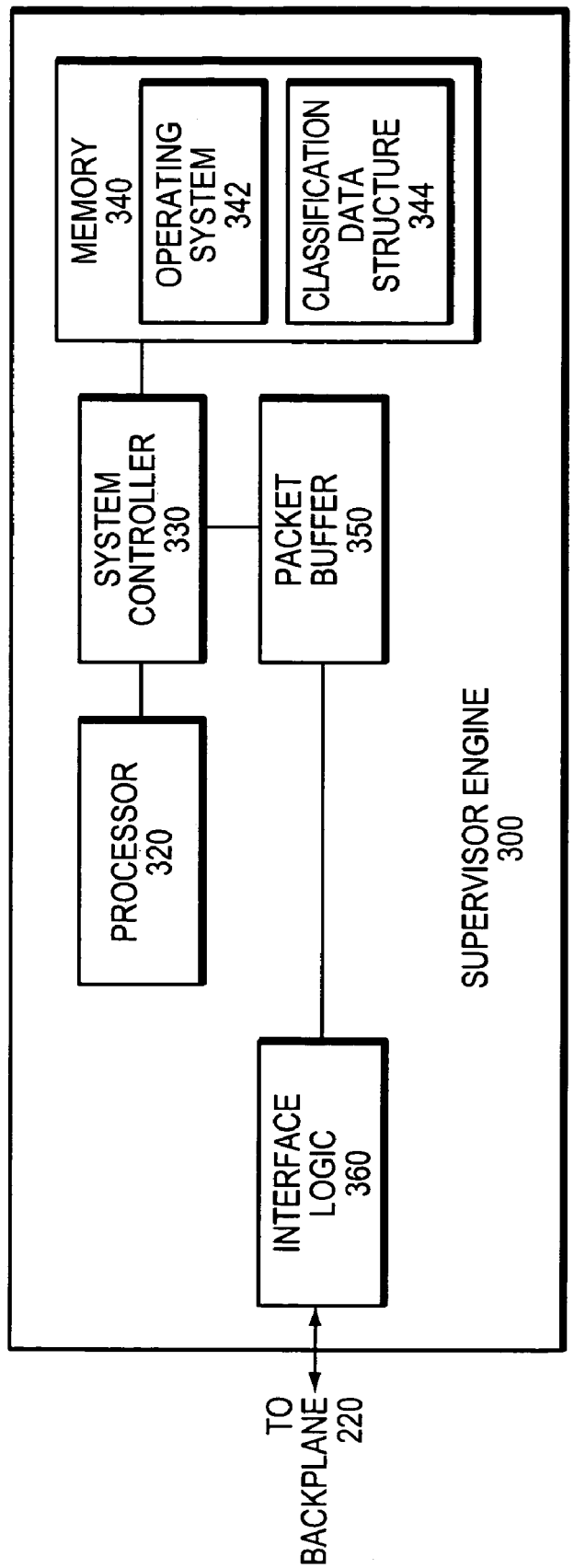
FIG. 3 is a high-level partial schematic block diagram of a supervisor engine that may be advantageously used with the present invention.

The supervisor engine 300 comprises logic that is, inter alia, configured to manage node 200, execute various protocols, such as OSPF, IS-IS, and MPLS, and perform other functions including classifying packets in accordance with inventive technique. FIG. 3 is a high-level partial schematic block diagram of a supervisor engine 300 that may be advantageously used with the present invention. Supervisor engine 300 comprises a processor 320, system controller 330, interface logic 360, packet buffer 350 and memory 340. The memory 340 comprises random access memory (RAM) locations addressable by the system controller 330 for storing, inter alia, data structures and software programs related to the inventive technique. Interface logic 360 is coupled to the backplane 220, and is configured to transfer data between the backplane 220 and the supervisor engine 300. Packet buffer 350 is a conventional packet memory containing RAM devices capable of storing packets acquired by the interface logic 360 and processed by the processor 320.

The memory 340 is a computer readable medium containing RAM devices, such as Dynamic Random Access Memory (DRAM) devices, configured to implement a 128 Megabyte (Mb) RAM. Memory 340 contains software and data structures used by processor 320 including operating system 342 and classification data structure 344. Classification data structure 344 is a data structure that contains data, such as the lookup tables and equivalence sets (described below), that are used to classify packets in accordance with the inventive technique.

Operating system 342 contains computer executable instructions executed by processor 320 to functionally organize the intermediate node 200 by, inter alia, invoking network operations in support of software processes executing on the supervisor engine 300. These processes may include software functions that implement various routing and switching protocols supported by the intermediate node 200, as well as processes and functions that implement aspects of the inventive technique. One skilled in the art would know that other computer readable mediums, such as disk storage devices and flash memory devices, may be used to store computer executable instructions that implement aspects of the present invention.

System controller 330 is coupled to the processor 320, memory 340 and packet buffer 350 and comprises circuitry configured to enable processor 320 to access (e.g., read, write) memory locations contained in the memory 340 and packet buffer 350. Processor 320 is a conventional routing processor configured to execute instructions contained in memory 340 for, inter alia, generating data structure 344 and utilizing data structure 344 to process packets in accordance with the inventive technique.

Figure 4:
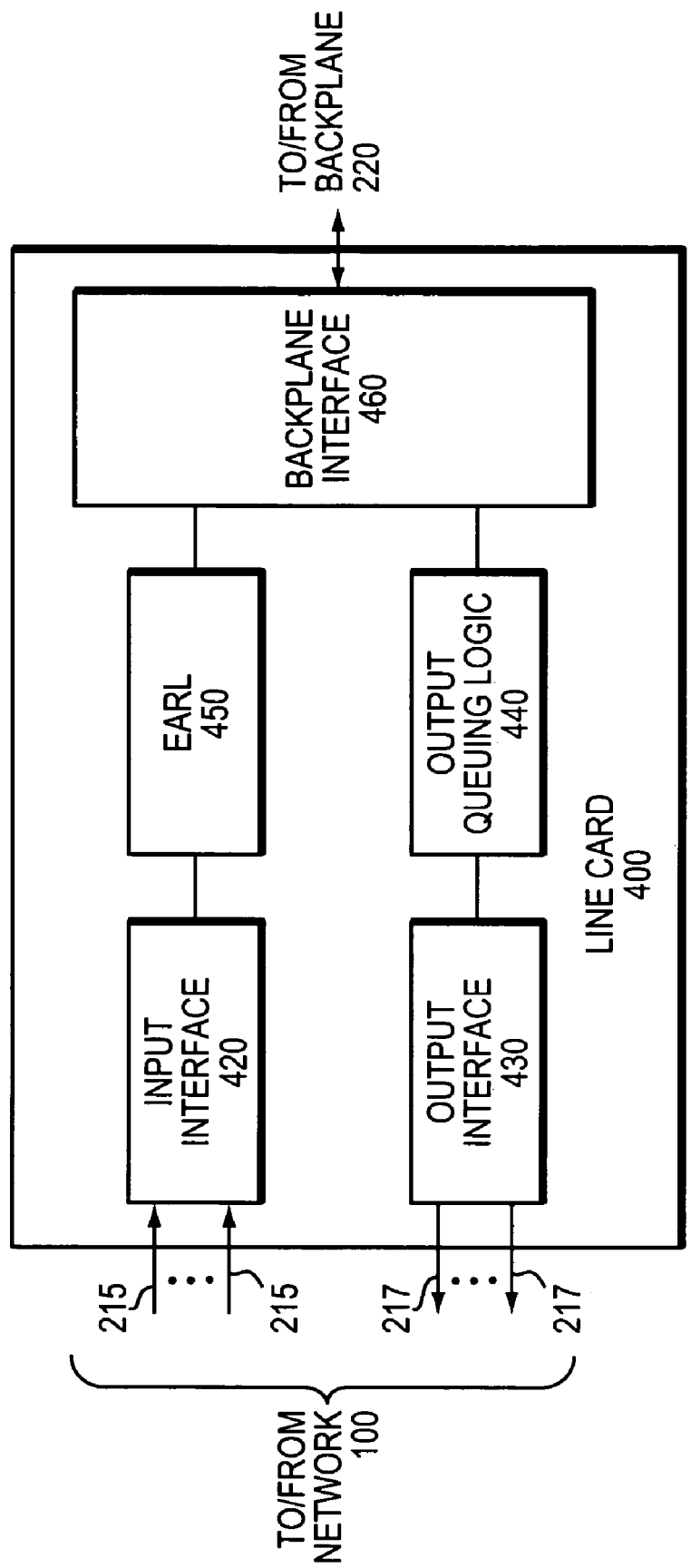
FIG. 4 is a high-level partial schematic block diagram of a line card that may be advantageously used with the present invention.

FIG. 4 is a high-level partial schematic block diagram of a line card 400 comprising input interface logic 420, encoded address recognition logic (EARL) 450, backplane interface logic 460, output queuing logic 440 and output interface logic 430. Each line card 400 may contain a plurality of input 215 and output 217 ports coupled to the network 100. The input interface logic 420 and output interface logic 430 interface the line card 400 to the network 100 via the input 215 and output 217 ports, respectively, and enable the line card 400 to transfer and acquire data to and from the network 100. To that end, logic 420 and 430 comprise conventional interface circuitry that may incorporate the signal, electrical and mechanical characteristics, and interchange circuits, needed to interface line card 400 with the network's physical media and protocols running over that media. The backplane interface logic 460 contains circuitry that interfaces the line card to the backplane 220 and enables the line card 400 to transfer and acquire data to and from other cards coupled to the backplane 220. The output queuing logic 440 contains circuitry, such as output queues and scheduling control logic, configured to control the transfer of data packets onto the network 100 via the output interface 430. The EARL 450 is illustratively embodied in an application-specific integrated circuit (ASIC) that comprises circuitry configured, inter alia, to acquire and process data packets including making forwarding decisions for the packets.

Operationally, a data packet is acquired from the network 100 by the input interface 420 and transferred to the EARL 450 where the packet is processed. This processing may include directing the backplane interface 460 to transfer the packet to another card, such as the supervisor engine 300, via the backplane 220 or to the output queuing logic 440 for transfer onto the network 100 via the output interface 430. Data packets acquired by the supervisor engine 300 are received from the backplane 220 by the interface logic 360 and placed in a packet buffer 350 where they are held for further processing by the processor 320. This processing may include utilizing classification data structure 344 to classify the packets in accordance with the inventive technique.

The present invention relates to a technique for classifying packets in a manner that enables the number of lookup operations performed when classifying a data packet to be reduced. According to the technique, a data packet is classified by performing a lookup operation to identify a set of rules and a set of actions associated with the data packet. If the action is the same for all the rules represented in the set of rules, the action is performed to classify the packet without performing further lookup operations. Otherwise, a next-level lookup operation is performed and the classification process is repeated for that level. The process continues until either a level is reached where the packet is classified (e.g., the action is the same for all the rules associated with the packet at that level) or a final level is reached. If a final level is reached, the packet is classified using the results of the lookup operation at the final level.

The inventive technique will be described as it relates to the classification technique described in the '896 application. It should be understood that the inventive technique may be applied to other classification techniques, such as the technique described in the '480 application and the technique described in "Packet Classification on Multiple Fields," by P. Gupta et al., Association for Computing Machinery (ACM) SIGCOMM '99 Proceedings, September 1999, Harvard University.

Figure 5:
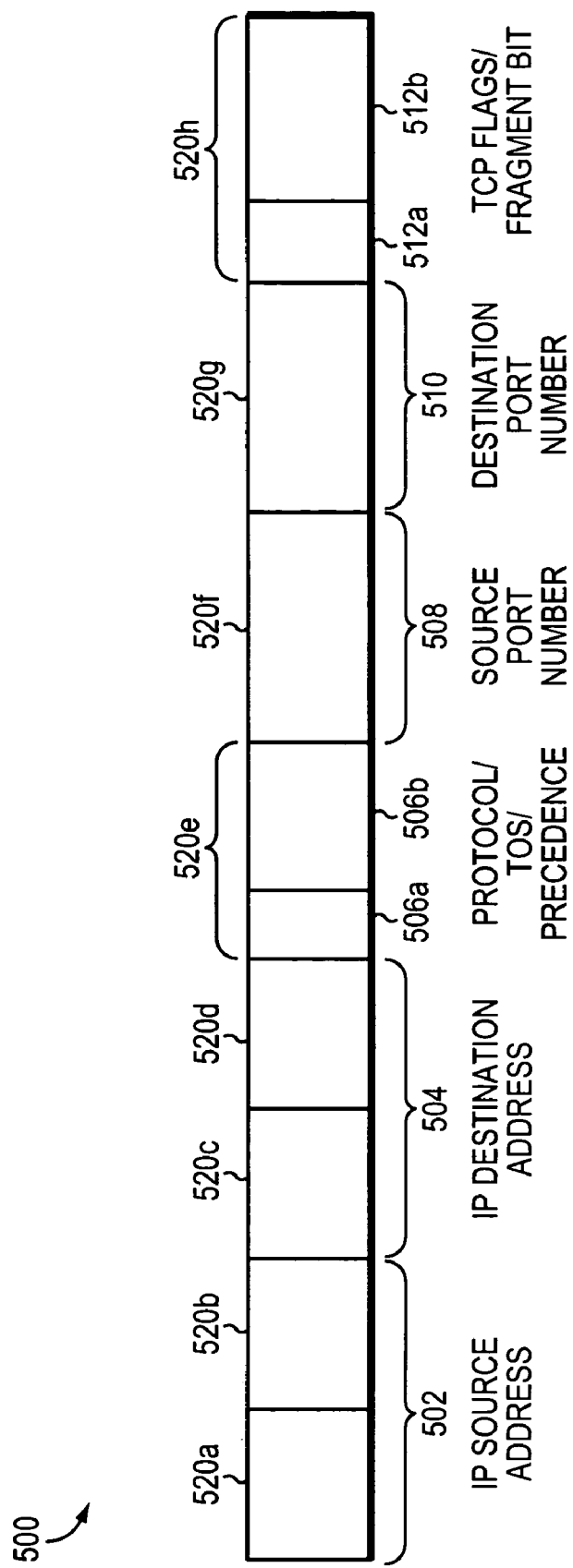
FIG. 5 is a packet header template that may be used to divide a Transmission Control Protocol/Internet Protocol packet header into sections for use in forming first-level lookup tables and equivalence sets.

Prior to classifying a packet, a packet template is established that divides a portion of the packet that is used to classify the packet (i.e., the packet's header) into sections. FIG. 5 illustrates an exemplary packet template 500 that may be used to divide a TCP/IP packet header into eight 16-bit equal-sized sections 520a-h. Template 500 contains a plurality of fields including an IP source address field 502, an IP destination address field 504, a protocol field 506a, a type of service (TOS)/precedence field 506b, a source port number field 508, a destination port number field 510, a IP fragment bit field 512a and a TCP flags field 512b.

The IP source address field 502 is divided into two 16-bit sections which include an upper 16 bits of the IP source address section 520a and a lower 16 bits of the IP source address section 520b. Likewise, the IP destination address field 504 is divided into two 16-bit sections which include an upper 16 bits of the IP destination address section 520c and a lower 16 bits of the IP destination address section 520d. Section 520f comprises the source port number field 508 and section 520g comprises the destination port number field 510. Some smaller fields such as a protocol field 506a and TOS/precedence field 506b are grouped together to form a section 520e. Likewise, the TCP flags field 512b is combined with the IP Fragment bit 512a to form a section 520h.

Each section is associated with a range of values. For example, a 16-bit section is associated with section values 0-65535. Illustratively, each section value is associated with a rule bitmap, which represents a set of rules associated with the section, and an action bitmap, which represents a set of actions associated with the rules in the set of rules. If a bit is set, e.g. to one, in the rule bitmap, the rule corresponding to that bit is associated with the section value. Conversely, if a bit in the rule bitmap is cleared (e.g. set to zero), the rule corresponding to that bit is not associated with the section value. Further, if a bit is set, e.g. to one, in the action bitmap, the action for the corresponding rule illustratively indicates "permit" and if the bit is cleared, e.g. set to zero, the action for the corresponding rule illustratively indicates "deny."

The rule bitmaps and action bitmaps are illustratively organized such that a bit position in the action bitmap corresponds to the rule represented at the same bit position in the rule bitmap. For example, an access control list (ACL) containing 8 rules may be represented by an 8-bit rule bitmap and an associated 8-bit action bitmap. A section value associated with a rule bitmap containing a binary value of B'10011101 and an action bitmap containing a binary value of B' 10011000' indicates (reading the bitmaps from left to right where the leftmost bit corresponds to rule 1) that rules 1, 4, 5, 6 and 8 are associated with the section value and that the actions associated with rules 1, 4, and 5 are permit and rules 6 and 8 are deny.

Figure 6:
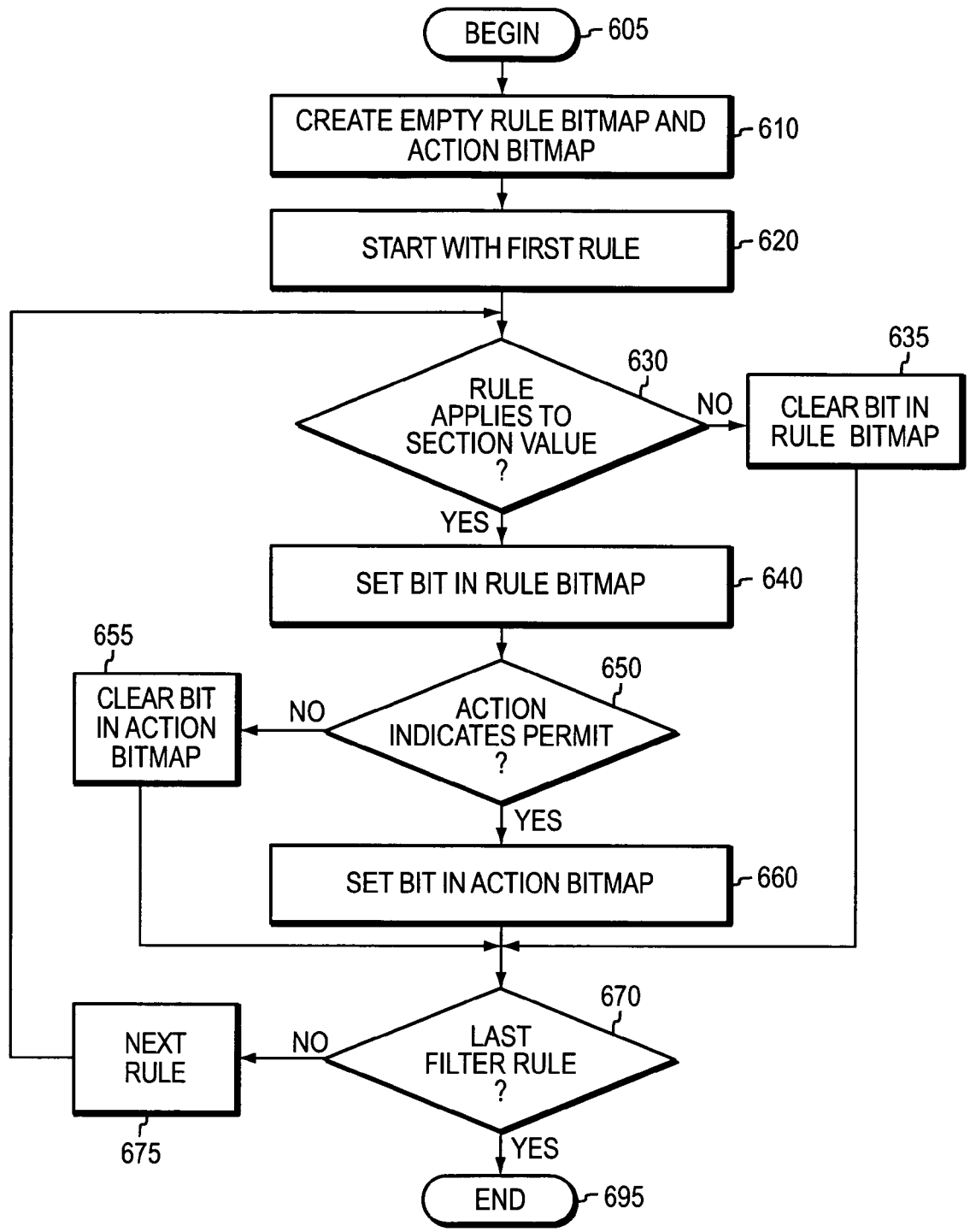
FIG. 6 is a flow diagram of a sequence of steps that may be used to create a rule bitmap and an action bitmap associated with a section value in accordance with the inventive technique.

FIG. 6 is a flow diagram of a sequence of steps that may be used to create a rule bitmap and an action bitmap associated with a section value, for a given set of rules in an ACL, in accordance with the inventive technique. The sequence begins at Step 605 and is proceeds to Step 610, where empty bitmaps are created and initialized for the rule bitmap and the action bitmap by e.g., allocating memory locations in data structure 344 to hold the bitmaps and initializing the empty bitmaps to zero. Starting with the first rule in the ACL (Step 620) the section value is compared with the rule's criteria to determine if the rule applies to the section value, as indicated at Step 630. If the rule applies, the sequence proceeds to Step 640 where the bit associated with the rule in the rule bitmap is set (e.g. to one); otherwise, the sequence proceeds to Step 635 where the associated bit is cleared (e.g. set to zero) and the sequence proceeds to Step 670.

At Step 650, a check is performed to determine if the action associated with the rule as specified in the ACL is "permit." If so, the sequence proceeds to Step 660 where the bit in the action bitmap associated with the rule is set (e.g. to one); otherwise, the sequence proceeds to Step 655 where the bit in the action bitmap is cleared (e.g. set to zero).

At Step 670, a check is performed to determine if all of the rules in the ACL have been processed. If not, the sequence proceeds to Step 675 where the next rule is located, and then returns to Step 630 where Steps 630-675 are repeated until all of the rules in the ACL have been processed. At Step 695 the sequence ends.

Prior to packet classification, first-level lookup tables and equivalence sets are generated for each of the packet's sections. The lookup tables and equivalence sets are organized such that each lookup table is associated with an equivalence set. Preferably each first-level lookup table is organized as a one-dimensional array that is indexed by a section value and each entry is configured to hold an index value that functions as an index to its associated equivalence set. Likewise, each equivalence set is organized as a one-dimensional array that is indexed by an index value and each entry is configured to hold a rule bitmap and an action bitmap associated with the index value.

Figure 7:
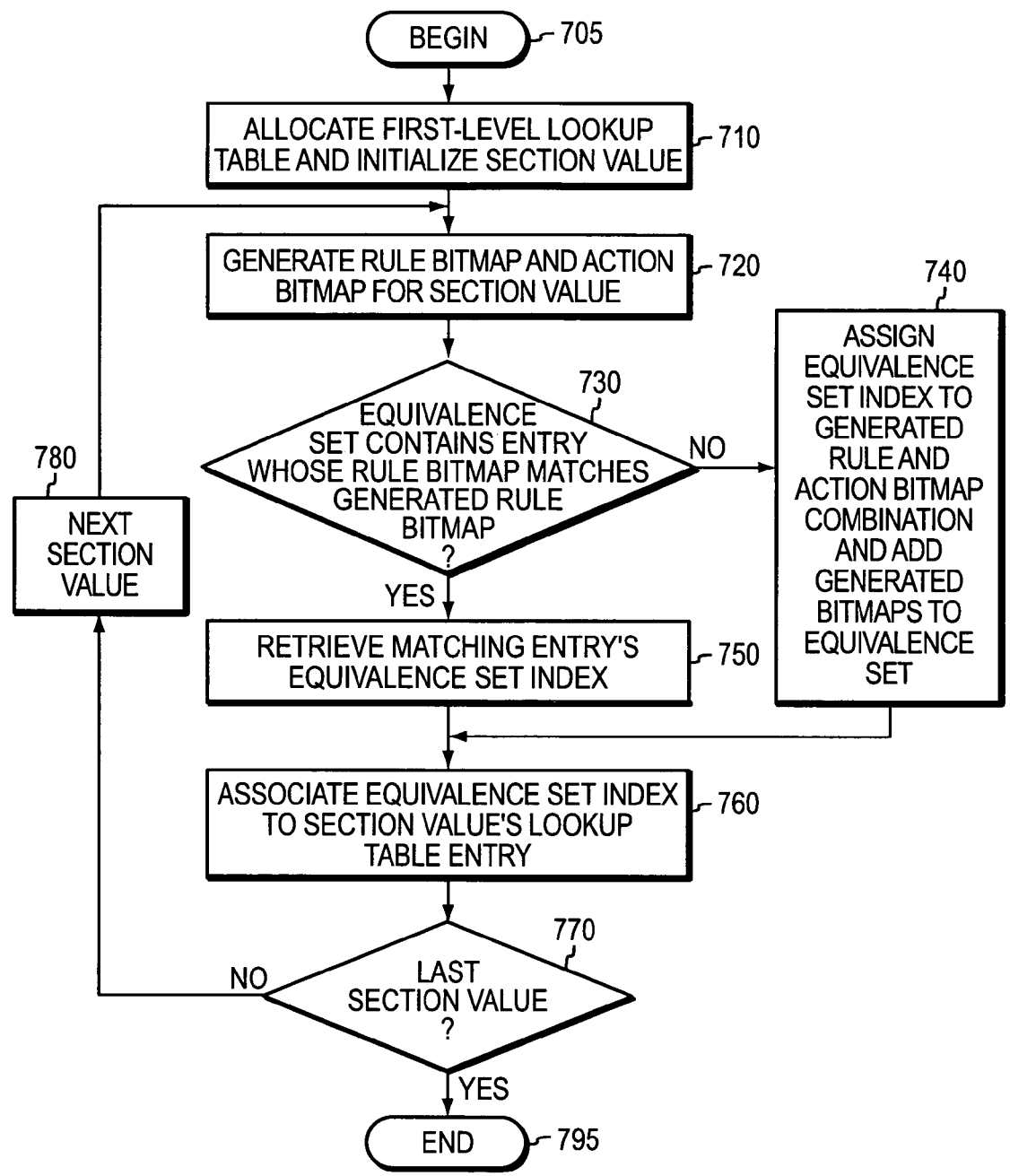
FIG. 7 is a flow diagram of a sequence of steps that may be used to generate a first-level lookup table and equivalence set.

FIG. 7 is a flow diagram of a sequence of steps that may be used to generate a first-level lookup table and equivalence set for a section in accordance with the inventive technique. Basically, the sequence iterates through all possible section values and associates each section value with a lookup table entry and an equivalence-set entry. The sequence begins at Step 705 and proceeds to Step 710 where the first-level lookup table associated with the section is e.g., allocated from memory 340 and added to data structure 344, and the section value is initialized to a starting value, preferably zero. Next at Step 720, a rule bitmap and an action bitmap for the section value are generated in a manner as described above. At Step 730, the equivalence set is searched to determine if it contains an entry whose rule bitmap matches the generated rule bitmap. If a matching entry is not found, the sequence proceeds to Step 740, where a new entry containing the new rule bitmap is added to the equivalence set and a new equivalence set index is associated with the entry. Otherwise, the sequence proceeds to Step 750 where the equivalence set index associated with the matching value is retrieved.

At Step 760, the equivalence set index is then associated with the section value's lookup table entry by placing the equivalence set index into the section values' lookup table entry. Next at Step 770, a check is performed to determine if the section value is the last section value to be processed. If not, the next section value is generated (Step 780) and the sequence returns to Step 720 where Steps 720 to 780 are repeated for all of the section values of a given section. The sequence ends at Step 795.

Prior to packet classification, a packet template 500 is established and the classification data structure 344 is initialized. Specifically, the classification data structure 344 is initialized by generating first-level lookup tables and equivalence sets as described above, pre-allocating and initializing lookup tables and equivalence sets for all lookup levels beyond the first-level (i.e., the "next levels") and placing the first and next-level lookup tables and equivalence sets in data structure 344. As used herein, a next-level lookup table and equivalence set refers to a lookup table and equivalence set for a level beyond the first level. The amount of memory space that is allocated to hold the next-level lookup tables and equivalence sets may be based on the amount of memory needed to hold a sub-set of the lookup tables and equivalence sets. For example, the amount of memory allocated may be based on an anticipated number of traffic flows processed by the intermediate node 200.

Figure 8:
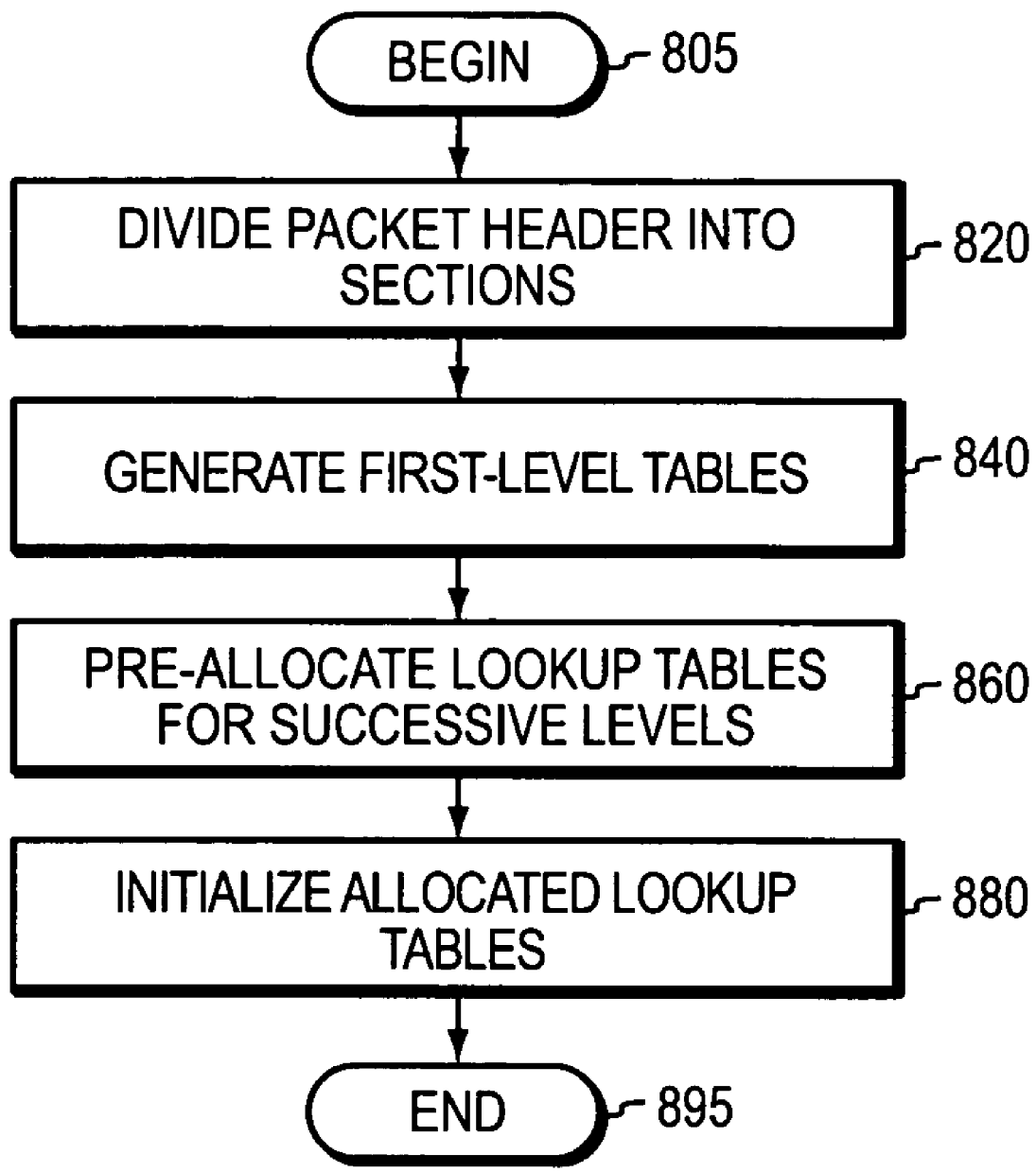
FIG. 8 is a high-level flow diagram of a sequence of steps that may be used to generate a packet template and initialize a classification data structure in accordance with the inventive technique.

FIG. 8 is a flow diagram of a sequence of steps that may be used to establish a packet template and initialize classification data structure 344 in accordance with the inventive technique. The sequence begins at Step 805 and proceeds to Step 820 where the packet template is established by dividing that portion of the data packet to be utilized to classify the packet (i.e., the packet's header) into illustratively equal-sized sections as described above. Next at Step 840 the first-level lookup tables and equivalence sets are generated, in a manner as described above, and added to data structure 344. At Step 860, "next level" lookup tables and associated equivalence sets are e.g. pre-allocated from memory 340 and added to the classification data structure 344 for all lookup levels beyond the first level. At Step 880, the lookup tables are initialized e.g. to indicate the entries contained therein are "missing." The sequence ends at Step 895.

A next-level equivalence set entry is generated by calculating the cross-product (intersection) of the equivalence-set entries from the prior level. Cross-producting is a technique whereby two entities are logically ANDed to produce a value that is the intersection of the two entities. For example, assume a bitmap B1 contains the binary value B'00111 and a bitmap B2 contains the binary value B' 11110. The cross-product of these bitmaps is the binary value B'00110 which is calculated by logically ANDing the value of B1 with the value of B2. Once the successive-level equivalence-set entry is generated, the associated lookup-table entry for that level is derived from information in the equivalence-set entry.

Figure 9:
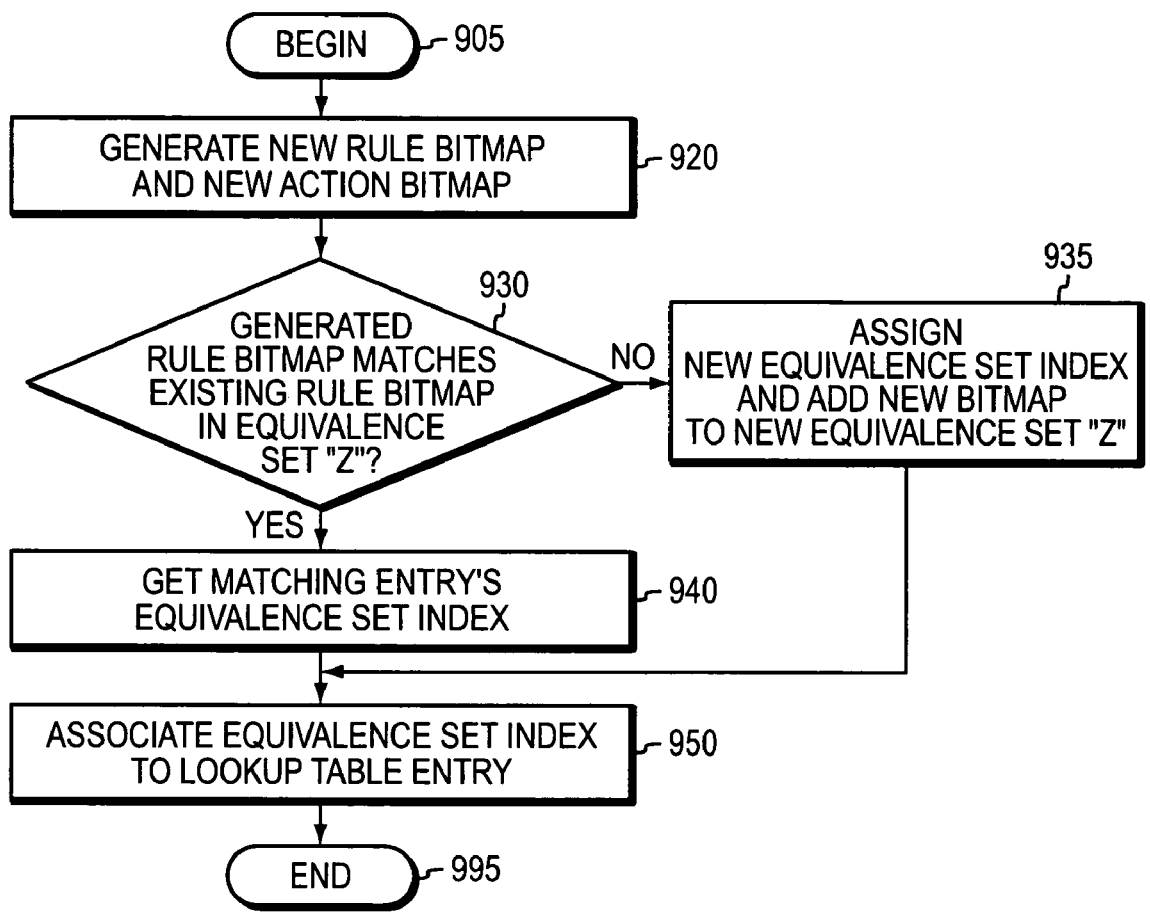
FIG. 9 is a flow diagram of a sequence of steps that may be used to merge two equivalence-set entries to form a new equivalence-set entry and lookup-table entry.

FIG. 9 is a flow diagram of a sequence of steps that may be used to generate a next-level lookup table entry and its associated equivalence set entry. Assume "X" and "Y" are equivalence sets from a prior level and that "Z" is an equivalence set that is associated with a next-level lookup table. Further, assume that an entry in equivalence set "X" associated with a first lookup table index is merged (cross-producted) with an entry in equivalence set "Y" that is associated with a second lookup table index to generate an entry for equivalence set "Z" and that the next-level lookup table entry is indexed by the combination of the first lookup table index and the second lookup table index. The sequence begins at Step 905 and proceeds to Step 920 where a new rule bitmap is generated by logically ANDing equivalence set "X" entry's rule bitmap with equivalence-set "Y" entry's rule bitmap to produce the new rule bitmap. In addition, a new action bitmap that is associated with the new rule bitmap is generated by logically ANDing equivalence set "X" entry's action bitmap with equivalence set "Y" entry's action bitmap to produce the new action bitmap. The new action bitmap is associated with the new rule bitmap.

At Step 930, equivalence set "Z" is searched to determine if it contains an entry whose rule bitmap matches the new rule bitmap. If not, the sequence proceeds to Step 935, where the new rule bitmap is assigned a new equivalence-set index and placed in equivalence set "Z" at the location selected by the newly assigned index. Otherwise if set "Z" contains an entry whose rule bitmap matches the new rule bitmap, the sequence proceeds to Step 940 where the equivalence-set index associated with the "matching" entry is fetched. Next at Step 950, the equivalence-set index value is associated with the generated next-level lookup table entry, i.e. the entry containing the newly generated rule bitmap and action bitmap. The sequence ends at Step 995.

In accordance with the inventive technique, packets are classified by: 1) dividing that portion of the packet used in the classification process, i.e. the packet's header, into sections, 2) identifying a set of rules and a set of actions for each section, 3) if the action is the same for all rules specified in the set of rules, performing the action to classify the packet; otherwise, 4) if the action is not the same, performing a next-level lookup operation to identify a set of rules and a set of actions associated with the next level and repeating step 3 above. This process is repeated until either a set of actions associated with a set of rules indicates the same action for all the rules or a final level is reached. If the final level is reached, an action is taken based on results associated with the final level. For example, the final level may yield an index that is used to index a results table to determine how the data packet is classified.

Figure 10:
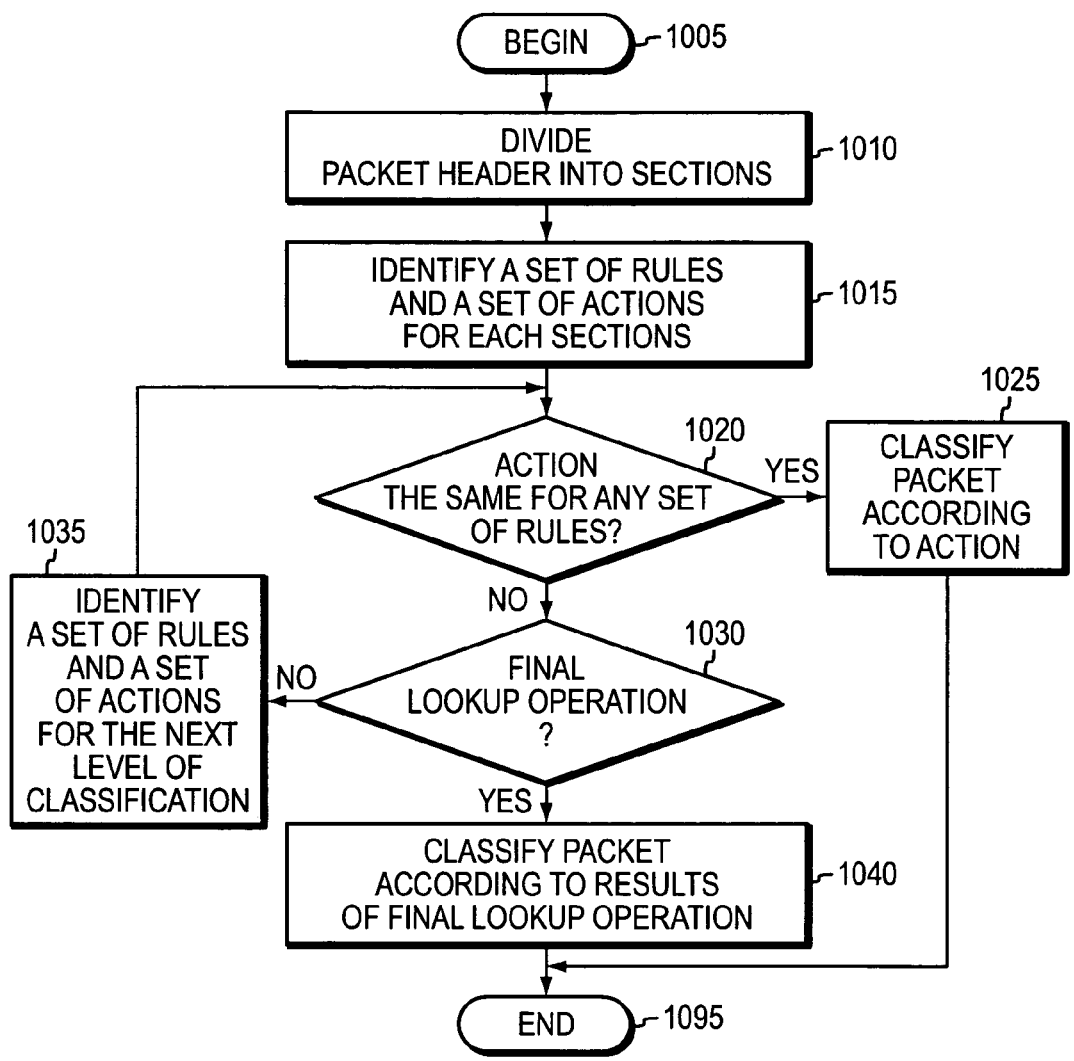
FIG. 10 is a high-level flow diagram of a sequence of steps that may be used to classify a data packet in accordance with the inventive technique.

FIG. 10 is a high-level flow chart containing a sequence of steps that may be used to classify a data packet in accordance with the inventive technique. The sequence begins as Step 1005 and proceeds to Step 1010 where that portion of the packet used to classify the packet, i.e. the packet's header, is divided into sections. Next, at Step 1015, a lookup operation is performed to identify a set of rules and a set of actions associated with the rules for each section by e.g., using a section value to index a first-level lookup table to acquire a rule bitmap and an action bitmap associated with an entry selected by the section value. At Step 1020, a check is performed to determine if the action indicated in the set of actions is the same for all rules indicated in the set of rules. If so, the sequence proceeds to Step 1025 where the data packet is classified based on the action and Step 1095 where the sequence ends. Otherwise, the sequence proceeds to Step 1030 where a check is performed to determine if the lookup operation is the final lookup operation performed to classify the packet, e.g. the lookup operation was performed on a final level lookup table in a lookup table hierarchy. If not, the sequence proceeds to Step 1035 where a lookup operation is performed to acquire a set of rules and associated set of actions for the next level of classification, e.g. a next level in a lookup table hierarchy, and the sequence returns to Step 1020. If at Step 1030, the lookup operation was the final lookup operation performed to classify the packet, the sequence proceeds to Step 1040 where the packet is classified according to the results of the final level lookup operation. The sequence ends at Step 1095.

Figure 11:
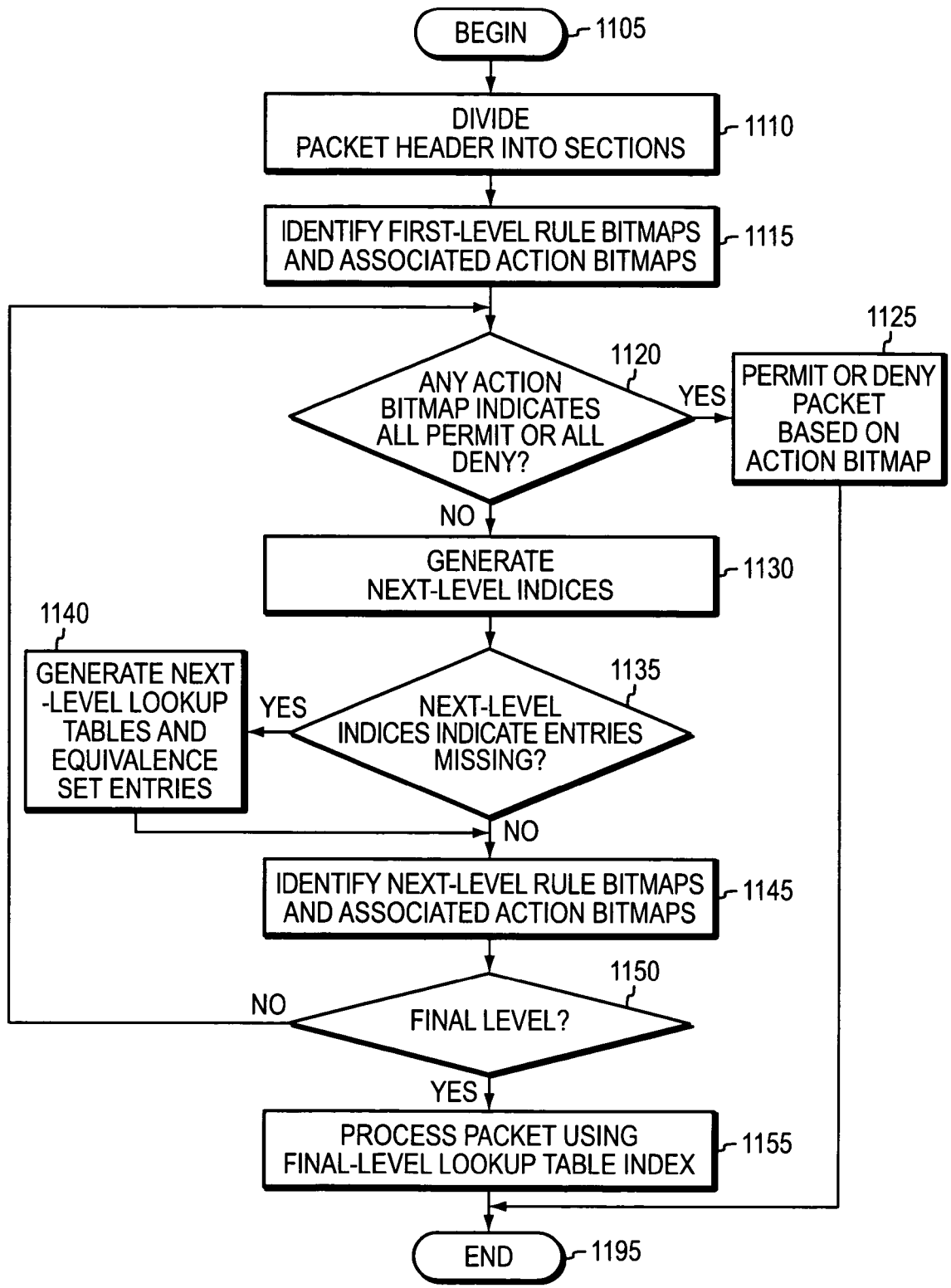
FIG. 11 is a flow diagram of a sequence of steps that illustrates an embodiment of the present invention that may be used to classify a packet in accordance with the inventive technique.

FIG. 11 is a flow diagram of a sequence of steps that illustrates an embodiment for classifying a packet in accordance with the inventive technique. The sequence begins at Step 1105 and proceeds to Step 1110 where the packet is divided into sections in a manner as described above. Next, at Step 1115, the packet sections are applied to the pre-generated first-level lookup tables to acquire first-level rule bitmaps and action bitmaps associated with the packet.

Next, a check is performed to determine if illustratively any of the generated action bitmaps indicate "all permit" or "all deny" for the rules associated with the packet (Step 1120). Illustratively, this step involves examining the rule bitmap and its associated action bitmap to determine if the action bitmap indicates either all permit or all deny for all rules indicated in the associated rule bitmap. If so, the sequence proceeds to Step 1125 where the packet is permitted or denied based on whether the action bitmap indicates all permit or all deny, respectively. For example, assume a rule bitmap associated with a packet contains a binary value of B' 11011. Further assume, an action bitmap associated with the rule bitmap indicates "permit" for a rule by a corresponding bit set to one in the action bitmap and "deny" for a rule by a corresponding bit cleared to zero in the action bitmap. If the action bitmap associated with rule bitmap contains a binary value of B'00000, the packet is denied because all rules represented in the rule bitmap indicate "deny" in their corresponding bits in the action bitmap. Likewise, if the action bitmap associated with the rule bitmap contains a binary value of B' 11011, then the packet is permitted because all rules represented in the rule bitmap indicate "permit" in their corresponding bits in the action bitmap. In both cases, the sequence proceeds from Step 1120 to Step 1125 where the action specified in the action bitmap (e.g., permit or denied) is performed. The sequence then ends at Step 1195.

If at Step 1120, the rule bitmaps and action bitmaps do not indicate all permit or all deny, a "next-level lookup operation" is performed on the next level's lookup tables and equivalence sets. Specifically, at Step 1130 indices associated with the "next-level" are generated. Illustratively, a "next-level index" is generated by combining the index values from the prior level's lookup tables for adjacent sections. For example, assume a data packet is divided into eight sections labeled "A", "B", "C", "D", "E", "F", "G" and "H." Further assume the first-level table index values for the sections are 1, 2, 3, 4, 5, 6, 7 and 8, respectively. The next-level indices are generated by combining the first-level table index values for adjacent sections; thus, the next-level indices that are generated are [1,2], [3,4], [5,6] and [7,8].

At Step 1135, a check is performed to determine if the generated indices indicate the lookup table entries for the next level are missing. Specifically, the generated indices are used to index entries in the next-level lookup table and a check is performed to determine if any of the next-level lookup table entries indicate they are "missing." If not, the sequence proceeds to Step 1145. Otherwise, the sequence proceeds to Step 1140 where the missing next-level lookup table entries and equivalence set entries associated with the generated indices are generated as described above. At Step 1145 the "next level" rule bitmaps and associated action bitmaps are identified by, e.g. 1) using the generated next-level indices to index into the next-level lookup tables to select entries in the next-level lookup tables and 2) using indices associated with the selected next-level lookup table entries to index into the next-level equivalence sets to select entries that contain the next-level rule bitmaps and action bitmaps. At Step 1150, a check is performed to determine if the generated lookup table and equivalence set entries are for the final-level lookup table in the table hierarchy. If not, the sequence returns to Step 1120. Otherwise, the sequence proceeds to Step 1155 where the packet is processed based on the results of the lookup operation on the final-level lookup table. This processing may include, for example, applying an index contained in a final-level table entry to a results table contained in the classification data structure 344 (FIG. 3) to identify an action that is used to classify the packet. The sequence ends at Step 1195.

FIG. 12 illustrates first-level and second-level lookup tables and equivalence sets for the upper and lower 16-bit sections of a source address of an IP packet using the above-described techniques. Assume a packet containing an IP source address 192.101.1.0 is classified. Further, assume the first-level lookup tables and equivalence sets have been built in a manner as described above and the second-level lookup table entries associated with the packet are "empty." The upper 16 bits of the packet's source address, i.e., 49253, is used to index its section's first-level lookup table 1205 to select entry 1206c which yields a second-level index value of 3 that is associated with entry 1210c in first-level equivalence set 1215. Likewise, the lower 16 bits of the packet's source address, i.e., 256, is used to index its section's first-level lookup table 1207 to select entry 1208b which yields a second-level index value of 2 that is associated with entry 1220b in first-level equivalence set 1225. The rule bitmap values and action bitmap values associated with entries 1210c and 1220b are then cross-producted, as described above, to generate a new rule bitmap with a binary value of B'00111, and action bitmap with a binary value B'00111 as indicated in line 1236f. The new rule bitmap and action bitmap are assigned an index, i.e., "2," and placed in the second-level equivalence set 1285 at entry 1280c which is associated with this index. Next, the index is placed in the second-level lookup table 1275 at entry 1270f, which is associated with the combined second-level indices [3,2].

As noted above in accordance with the inventive technique, a check is performed to determine if the newly generated action bitmap indicates, e.g. "all permit" or "all deny" for the rules associated with the action. Since the action bitmap at equivalence set entry 1280c indicates "all permit" for the rules represented in the rule bitmap, the packet is permitted. Note that, had the action bitmap contained a binary value of B'00000 (indicating "all deny"), the packet would have been denied.

Now assume a packet containing an IP source address 192.100.1.0 is classified. Further assume, the first-level and second-level lookup tables and equivalence sets for the sections have been built, in a manner as described above. The upper 16 bits of the packet's source address, i.e., 49252, is used to index its section's first-level lookup table 1205 to select entry 1206b which yields an index of 2 that is associated with entry 1210b of the first-level equivalence set 1215. Likewise, the lower 16 bits of the packet's source address, i.e. 256, is used to index its section's first-level lookup table 1207 to select entry 1208b which yields a second-level index value of 2 that is associated with entry 1220b in first-level equivalence set 1225. Since the equivalence set entry and lookup table entry for the combined indices, i.e. [2,2], have been built the combined indices are used to identify the index for the second-level equivalence set, i.e. 1. Since the action bitmap for the second-level equivalence set entry does not indicate "all permit" or "all deny" for the rules associated with the action bitmap, the classification continues with the next level in a manner as described above.

It should be noted that in the above-described illustrated embodiment, actions contained in the set of actions are represented by a bitmap. However, in other embodiments of the invention the actions are represented in other forms, such as other numeric values or string values that may represent actions other than "permit" or "deny." Two sets containing the actions may be merged to form a next level set by taking the intersection of the two sets.

Also, it should be noted that in the above-illustrated embodiment of the invention, the lookup tables and equivalence sets for successive-levels are pre-allocated in, e.g. memory 340 in accordance with the technique described in the '896 application. According to this technique, the amount of resources allocated to the successive-level lookup tables and equivalence sets is based on an estimation of different traffic flows handled by the intermediate node 200. Entries in the pre-allocated lookup tables and equivalence sets are consumed when new traffic flows are classified and the classification of the new traffic flow results in encountering an empty lookup table entry. Further, if the pre-allocated lookup tables become exhausted, e.g. due to having to classify more traffic flows that where initially estimated, the lookup tables and equivalence sets are reinitialized to handle the greater number of traffic flows, therefore consuming additional resources. Advantageously, the present invention enables resources to be conserved as successive-level lookup table entries and equivalence sets are not consumed when a new flow is classified using earlier-generated lookup table information, as described above.

Figure 13:
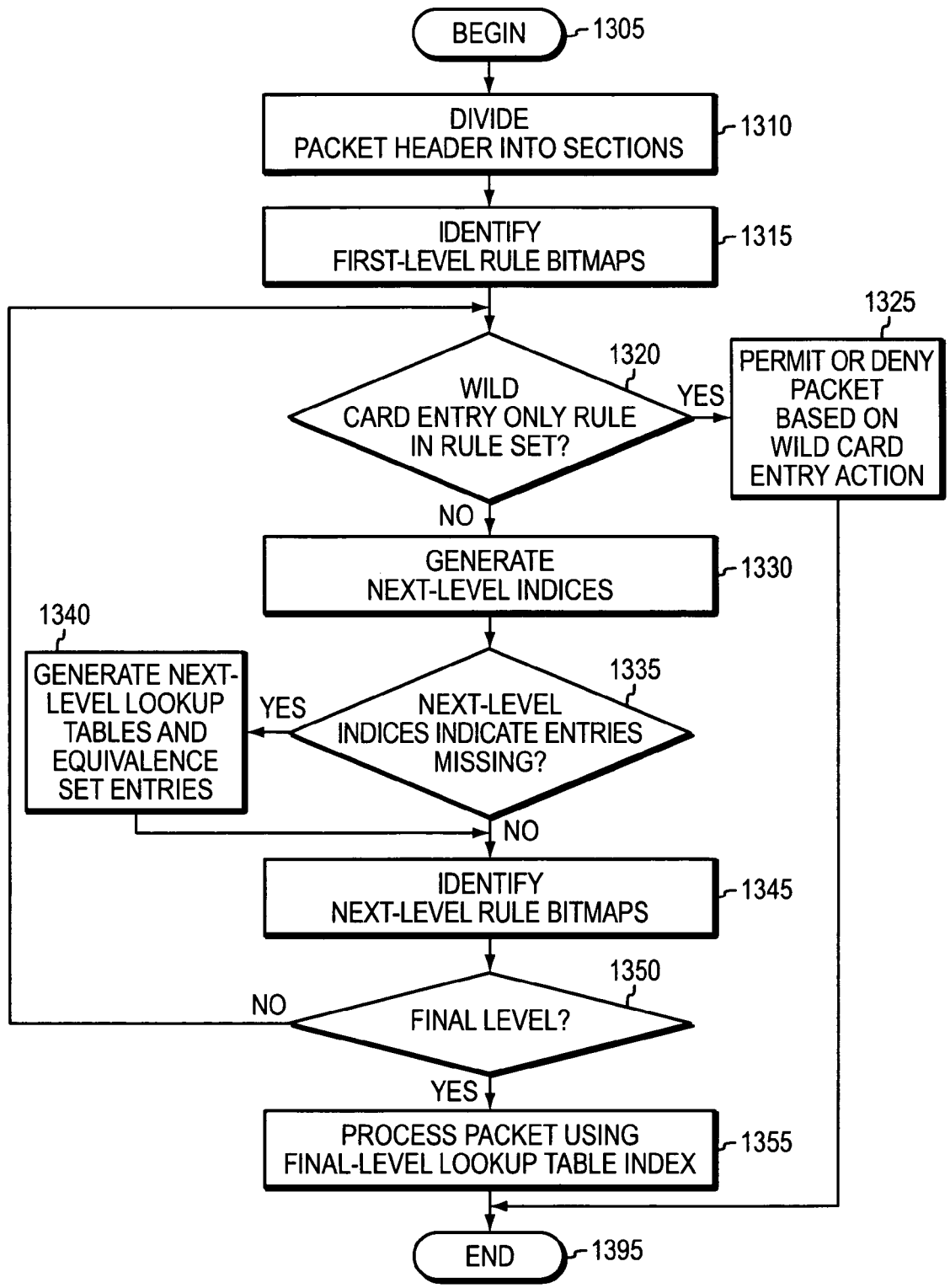
FIG. 13 is a flow chart of a sequence of steps that may be used to classify a packet in accordance with the inventive technique using an ACL containing a wild-card entry.

Also, it should be noted that in some situations involving ACLs, identifying the exact ACL rule that matched the packet is of high statistical importance. In an embodiment of the invention, early termination of the classification process only occurs if the packet matches a "wild-card" rule contained in the ACL, thus enabling ACL match count statistics to be preserved. FIG. 13 is a flow chart of a sequence of steps that may be used to preserve ACL match counts for packets classified in accordance with the inventive technique using an ACL containing a wild-card rule. The sequence begins at Step 1305 and proceeds to Step 1310 where that portion of the packet used to classify the packet is divided into sections, as described above. At Step 1315, the first-level rule bitmaps associated with the packet are identified, as described above. Next, at Step 1320, a check is performed to determine if a rule represented in the identified rule bit map is associated with a wild-card rule in the ACL. If so, the sequence proceeds to Step 1325 where the packet is classified according to action associated with the wild-card rule. Otherwise, the sequence proceeds to Step 1330 where the next-level indices are generated, as described above.

At Step 1335, a check is performed to determine if the generated indices indicate the lookup table entries for the next level are missing, as described above. If not, the sequence proceeds to Step 1345. Otherwise, the sequence proceeds to Step 1340 where the missing next-level lookup table entries and equivalence set entries associated with the generated indices are generated, as described above. At Step 1345 the "next level" rule bitmaps are identified, as described above. At Step 1350, a check is performed to determine if the generated lookup table and equivalence set entries are for the final-level lookup table in the table hierarchy. If not, the sequence returns to Step 1320. Otherwise, the sequence proceeds to Step 1355 where the packet is processed based on the results of the lookup operation on the final-level lookup table, as described above. The sequence ends at Step 1395.

It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for classifying a data packet in accordance with one or more rules wherein the data packet contains a packet header that is used to classify the packet, the method comprising the steps of:
   dividing the packet header into a plurality of sections;
   for each section, performing a lookup operation to acquire a set of rules and a set of actions associated the section, wherein the set of rules represents one or more rules associated with the section and the set of actions contains an action for each rule represented in the set of rules;
   for a particular section, determining if each action in the set of actions indicates the same action for all the rules represented in the set of rules associated with the section; and
   if so, classifying the data packet based on the action indicated in the set of actions for the particular section.

2. A method as defined in claim 1 comprising the steps of:
   determining if the lookup operation performed is a final lookup operation; and
   if so, classifying the data packet according to the results of the lookup operation.

3. A method as defined in claim 2 wherein the final lookup operation yields a results table index.

4. A method as defined in claim 3 comprising the step of:
   using the results table index to identify an action that is used to classify the data packet.

5. A method as defined in claim 1 comprising the step of:
   for the particular section, if each action in the set of actions is not the same, performing a next-level lookup operation to identify a set of rules and a set of actions associated with a next level of classification.

6. A method as defined in claim 1 wherein the acquired set of rules is represented as a rule bitmap and the identified set of actions is represented as an action bitmap.

7. A method as defined in claim 6 comprising the steps of:
   for each section, using a value associated with the section to index a first-level lookup table to acquire an equivalence set index associated with the section; and
   using the equivalence set index to acquire a first-level rule bitmap and a first-level action bitmap associated with the section.

8. A method as defined in claim 7 comprising the steps of:
   determining if the acquired action bitmap indicates the same action for all rules represented in the rule bitmap; and
   if so, classifying the packet based on the action indicated in the acquired action bitmap.

9. A method as defined in claim 7 comprising the step of:
   determining if the acquired action bitmap indicates the same action for all rules represented in the rule bitmap; and
   if not, performing a next-level lookup operation.

10. A method as defined in claim 1 comprising the steps of:
  applying values associated with the sections to first-level lookup tables to acquire equivalence set indices associated with the section;
  generating a next-level lookup table index using the equivalence set indices;
  applying the next-level lookup table index to a next-level lookup table to acquire a next-level lookup table entry;
  determining if the next-level lookup table entry is empty; and
  if so, generating a next-level lookup table entry and a next-level equivalence set entry associated with the next-level lookup table index.

11. An apparatus for classifying a data packet in accordance one or more rules, using a hierarchy of lookup tables, the hierarchy comprising a first level and one or more successive levels, the data packet containing a packet header that is used to classify the packet, the apparatus comprising:
  a memory coupled to the processor and configured to hold the hierarchy of lookup tables; and
  a processor adapted to (i) divide the packet header into a plurality of sections, (ii) perform a lookup operation for each section in a first-level lookup table associated with the first level to acquire a set of rules and a set of actions associated with the rules for the section, (iii) determine if the action specified for each rule in the set of rules is the same, (iv) and if so, classifying the packet according to the action.

12. An apparatus as defined in claim 11 wherein the processor is configured to perform a next-level lookup operation if the action specified for each rule in the set of rules is not the same.

13. An apparatus as defined in claim 11 wherein the processor is configured to determine if the lookup operation is a final lookup operation and if so, classify the data packet according to the results of the lookup operation.

14. An apparatus as defined in claim 11 wherein the acquired set of rules is represented as a rule bitmap and the identified set of actions is represented as an action bitmap.

15. An apparatus as defined in claim 14 wherein the processor is configured to, for each section, acquire an equivalence set index associated with the section and use the equivalence set index to index an equivalence set to acquire a rule bitmap and action bitmap associated with the section.

16. An apparatus as defined in claim 15 wherein the processor is configured to determine if the acquired action bitmap indicates the same action for all rules represented in the rule bitmap and if so, classify the packet based on the action indicated in the identified action bitmap.

17. An apparatus as defined in claim 15 wherein the processor is configured to determine if the identified action bitmap indicates the same action for all rules represented in the rule bitmap and if not, perform a next-level lookup operation.

18. An intermediate node comprising:
  means for dividing the packet header into a plurality of sections;
  means for performing a lookup operation to acquire a set of rules and a set of actions associated with each section, wherein the set of rules represents one or more rules associated with a section and the set of actions contains an action for each rule represented in the set of rules;
  means for determining, for each section, if each action in the set of actions indicates the same action for all the rules represented in the set of rules associated with the section; and
  means for classifying the data packet based on the action indicated in the set of actions for the particular section if the action is the same.

19. An intermediate node as defined in claim 18 comprising:
  means for determining if the lookup operation performed is a final lookup operation; and
  means for classifying the data packet according to the results of the lookup operation if the lookup operation performed is the final lookup operation.

20. A computer readable medium encoded with computer executable instructions:
  dividing a packet header, contained in a data packet that is used to classify the data packet, into a plurality of sections;
  for each section, performing a lookup operation to acquire a set of rules and a set of actions associated the section, wherein the set of rules represents one or more rules associated with the section and the set of actions contains an action for each rule represented in the set of rules;
  for a particular section, determining if each action in the set of actions indicates the same action for all the rules represented in the set of rules associated with the section; and
  if so, classifying the data packet based on the action indicated in the set of actions for the particular section.

* * * * *